United States Patent
Horiguchi

(10) Patent No.: US 8,547,460 B2
(45) Date of Patent: Oct. 1, 2013

(54) SOLID-STATE IMAGING ELEMENT, DRIVING METHOD THEREFOR, AND CAMERA SYSTEM WITH A PIXEL DRIVE CONTROL UNIT CONCURRENTLY ACCESSING A WINDOW REGION AND THE ADJACENT OUTER ROW

(75) Inventor: Hiroshi Horiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 475 days.

(21) Appl. No.: 12/585,364

(22) Filed: Sep. 14, 2009

(65) Prior Publication Data

US 2010/0085458 A1    Apr. 8, 2010

(30) Foreign Application Priority Data

Oct. 3, 2008  (JP) ................. 2008-258698

(51) Int. Cl.
*H04N 3/14* (2006.01)
*H04N 5/335* (2011.01)
(52) U.S. Cl.
USPC .......................................... 348/294; 348/308
(58) Field of Classification Search
None
See application file for complete search history.

(56) References Cited

U.S. PATENT DOCUMENTS

| | | | |
|---|---|---|---|
| 6,483,541 B1* | 11/2002 | Yonemoto et al. | 348/302 |
| 6,900,837 B2* | 5/2005 | Muramatsu et al. | 348/243 |
| 2001/0043275 A1* | 11/2001 | Hirota et al. | 348/312 |
| 2002/0054228 A1* | 5/2002 | Miyahara | 348/312 |
| 2008/0054320 A1* | 3/2008 | Solhusvik et al. | 257/292 |
| 2009/0109312 A1* | 4/2009 | Noda et al. | 348/304 |
| 2009/0180014 A1* | 7/2009 | Noda et al. | 348/308 |

FOREIGN PATENT DOCUMENTS

| | | |
|---|---|---|
| JP | 63-185285 A | 7/1988 |
| JP | 2001-045383 | 2/2001 |
| JP | 2005-184358 A | 7/2005 |
| JP | 2006-310932 | 11/2006 |
| JP | 2007-158741 A | 6/2007 |

OTHER PUBLICATIONS

Japanese Office Action issued Nov. 6, 2012 for corresponding Japanese Application No. 2008-258698.

* cited by examiner

*Primary Examiner* — Justin P Misleh
(74) *Attorney, Agent, or Firm* — Rader, Fishman & Grauer PLLC

(57) ABSTRACT

A solid-state imaging element includes a pixel array unit having pixels arranged in a matrix, each pixel including a photoelectric conversion element, and a pixel drive control unit capable of controlling driving of the pixel array unit so as to perform a read or reset access operation of the pixel array unit in accordance with specified address information. The pixel drive control unit is capable of setting a desired region in the pixel array unit as a window region to be accessed. The pixel drive control unit includes a function for performing, concurrently with access to the window region and output processing, read or reset access on at least one adjacent outer row that is adjacent to the window region.

17 Claims, 15 Drawing Sheets

SOLID-STATE IMAGING ELEMENT, DRIVING METHOD THEREFOR, AND CAMERA SYSTEM WITH A PIXEL DRIVE CONTROL UNIT CONCURRENTLY ACCESSING A WINDOW REGION AND THE ADJACENT OUTER ROW

BACKGROUND OF THE INVENTION

1. Field of the Invention

The present invention relates to a solid-state imaging element such as a complementary metal oxide semiconductor device (CMOS) image sensor, a driving method therefor, and a camera system.

2. Description of the Related Art

In recent years, CMOS image sensors have attracted attention as solid-state imaging elements (image sensors) replacing charge coupled device (CCD) image sensors.

CMOS image sensors have overcome the following problems:

The manufacture of CCD pixels involves special processes, and a plurality of power supply voltages are used to operate them. In addition, it is necessary to operate a plurality of peripheral integrated circuits (ICs) in combination.

Such CCD technology increases system complexity. These various problems have been overcome by the CMOS image sensors.

X-Y addressing solid-state imaging elements such as the CMOS image sensors are configured to perform pixel selection row-by-row, column-by-column, or pixel-by-pixel on a pixel array unit having a two-dimensional array of pixels including photoelectric conversion elements which are arranged in a matrix.

Further, row-access solid-state imaging elements provide read access to the pixel array unit and reset access for shutter release.

CMOS image sensors generally employ a pixel reset method in which pixels are sequentially reset row-by-row. This method is called the rolling shutter method.

In the solid-state imaging elements, an optically masked image, or an optical black region, is also formed to determine the noise floor.

In the solid-state imaging elements, a technique for specifying a desired region in the pixel array unit and providing partial cutting and readout of pixel information concerning the desired region has been proposed (see, for example, Japanese Unexamined Patent Application Publication No. 2001-45383).

Accordingly, a solid-state imaging element disclosed in Japanese Unexamined Patent Application Publication No. 2001-45383 has a function for cutting and reading out a necessary region ("window readout" function).

With the window readout, the solid-state imaging element can reduce the number of output lines to outside the solid-state imaging element.

In a solid-state imaging element, however, when a desired partial readout region is sequentially read row-by-row, the following phenomenon, called blooming, occurs because of no access control such as readout of pixels in rows below and above the partial readout region.

Charge photoelectrically converted and accumulated in a photoelectric conversion element in a pixel may exceed the capacity of the photoelectric conversion element and overflow to neighboring pixels.

The charge overflowing to the neighboring pixels affects the imaging performed by the neighboring pixels. In CMOS image sensors, an overflow of charge from pixels above and below the pixels in the partial readout region may cause a blooming phenomenon which produces unwanted image defects in this region.

One of methods for preventing blooming is as follows.

A window region is set larger than desired, and the set region is normally accessed to prevent unwanted flow of charge.

In this method, however, pixel data in unnecessary rows is output to the outside, resulting in an increase in the number of outputs to outside as shown in FIG. 1.

The output rows and the like of a row-access solid-state imaging element will now be described with reference to FIGS. 1 and 2.

As shown in FIG. 1, output rows of a row-access solid-state imaging element include rows in a recording pixel region, a color-processing margin region, an ineffective region, an optical black region, an ineffective optical black region, and a blanking region.

Data for the ineffective region, the ineffective optical black region, and the blanking region are unnecessary.

A blanking output is provided for the communication period between the solid-state imaging element and the outside, the waiting time for stabilizing the internal circuit after the settings of the solid-state imaging element, such as the gain value, have been changed, the timing adjustment between the solid-state imaging element and the outside, and the like.

In a blanking period, as shown in FIG. 2, no read access or reset access to the pixel array unit is performed. Alternatively, access to a specific address that does not affect readout data is performed.

In a solid-state imaging element, generally, no window region is set in an optical black region and the number of output rows is fixed by the pixel array unit.

Furthermore, the number of optical black lines depends on use. For example, a large number of optical black lines are necessary for photographing still images while a reduced number of optical black lines can be used for photographing moving images.

A method for preventing the occurrence of blooming and preventing an unnecessary row of pixel data from being output to the outside is disclosed in Japanese Unexamined Patent Application Publication No. 2006-310932.

SUMMARY OF THE INVENTION

The technique disclosed in Japanese Unexamined Patent Application Publication. No. 2006-310932, however, has the disadvantage of increasing the number of necessary circuits, leading to an increase in circuit size.

Specifically, in this technique, a non-access row is reset concurrently with the read and shutter operations. Thus, it is necessary to provide a pixel array control circuit including the "row read control circuit 12", the "row reset control circuit 13", and the "non-access row reset control circuit 14".

It is therefore desirable to provide a solid-state imaging element, a driving method therefor, and a camera system which can prevent the occurrence of blooming and prevent an unnecessary row of pixel data from being output to the outside while preventing an increase in the circuit size.

According to an embodiment of the present invention, a solid-state imaging element includes a pixel array unit having pixels arranged in a matrix, each pixel including a photoelectric conversion element, and a pixel drive control unit capable of controlling driving of the pixel array unit so as to perform a read or reset access operation of the pixel array unit in accordance with specified address information. The pixel drive control unit is capable of setting a desired region in the pixel array unit as a window region to be accessed. The pixel drive control unit includes a function for performing, concurrently with access to the window region and output processing, read or reset access on at least one adjacent outer row that is adjacent to the window region.

According to another embodiment of the present invention, a driving method for a solid-state imaging element includes the steps of setting a desired region in a pixel array unit as a window region to be accessed, the pixel array unit having pixels arranged in a matrix, each pixel including a photoelectric conversion element, and performing, concurrently with access to the window region and output processing, read or reset access on at least one adjacent outer row that is adjacent to the window region.

According to still another embodiment of the present invention, a camera system includes a solid-state imaging element, an optical system configured to form a subject image on the solid-state imaging element, and a signal processing circuit configured to process an output image signal of the solid-state imaging element. The solid-state imaging element includes a pixel array unit having pixels arranged in a matrix, each pixel including a photoelectric conversion element, and a pixel drive control unit capable of controlling driving of the pixel array unit so as to perform a read or reset access operation of the pixel array unit in accordance with specified address information. The pixel drive control unit is capable of setting a desired region in the pixel array unit as a window region to be accessed. The pixel drive control unit includes a function for performing, concurrently with access to the window region and output processing, read or reset access on at least one adjacent outer row that is adjacent to the window region.

According to the embodiments of the present invention, the pixel drive control unit sets a desired region in the pixel array unit as a window region to be accessed.

Further, the pixel drive control unit performs, concurrently with access to the window region and output processing, read or reset access on at least one adjacent outer row that is adjacent to the window region.

According to an embodiment of the present invention, therefore, blooming can be prevented from occurring and an unnecessary row of pixel data can be prevented from being output to the outside while preventing an increase in the circuit size.

DESCRIPTION OF THE PREFERRED EMBODIMENTS

Embodiments of the present invention will be described hereinafter with reference to the drawings.

First Embodiment

Figure 3:
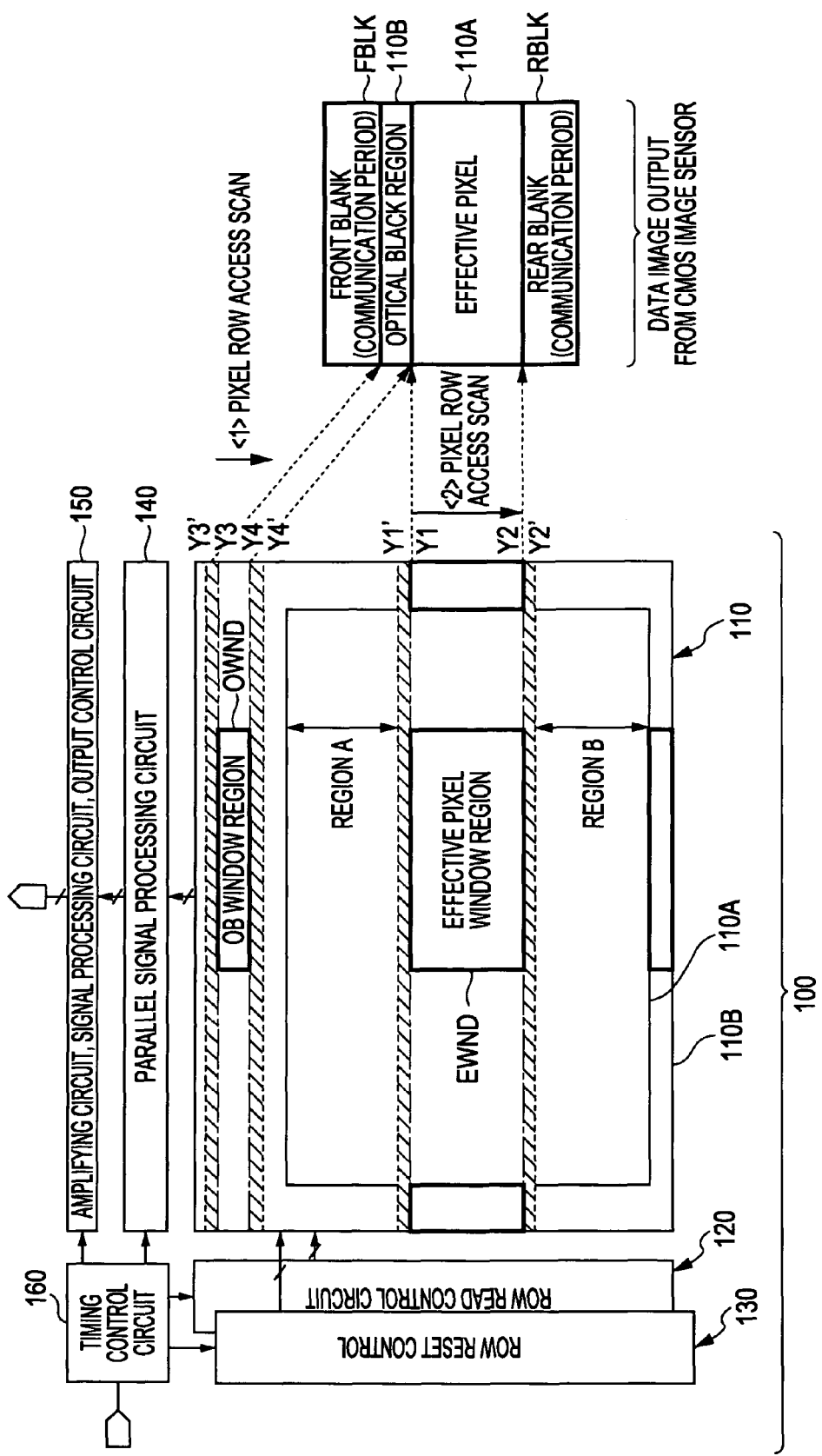
FIG. 3 is a diagram showing an example configuration of a CMOS image sensor (solid-state imaging element) according to a first embodiment of the present invention.

FIG. 3 is a diagram showing an example configuration of a CMOS image sensor (solid-state imaging element) 100 according to a first embodiment of the present invention.

The CMOS image sensor 100 according to the first embodiment includes a pixel array unit 110, a row read control circuit 120, a row reset control circuit 130, a parallel signal processing circuit 140, an output control circuit 150, and a timing control circuit 160.

The row read control circuit 120, the row reset control circuit 130, and the timing control circuit 160 may constitute a pixel drive control unit.

The pixel array unit 110 has a two-dimensional array of pixel circuits which are arranged in a matrix.

The pixel array unit 110 includes an effective pixel region 110A, and a light-blocking pixel region (optical black region) 110B defined along the periphery of the effective pixel region 110A.

The effective pixel region 110A may be a region where signals obtained using photoelectric conversion in the pixel circuits are used as imaging signals.

The optical black region 110B is defined around the effective pixel region 110A in a manner so as to be blocked from light, and is used for determining a black level of a signal of each of the pixel circuits.

Figure 4:
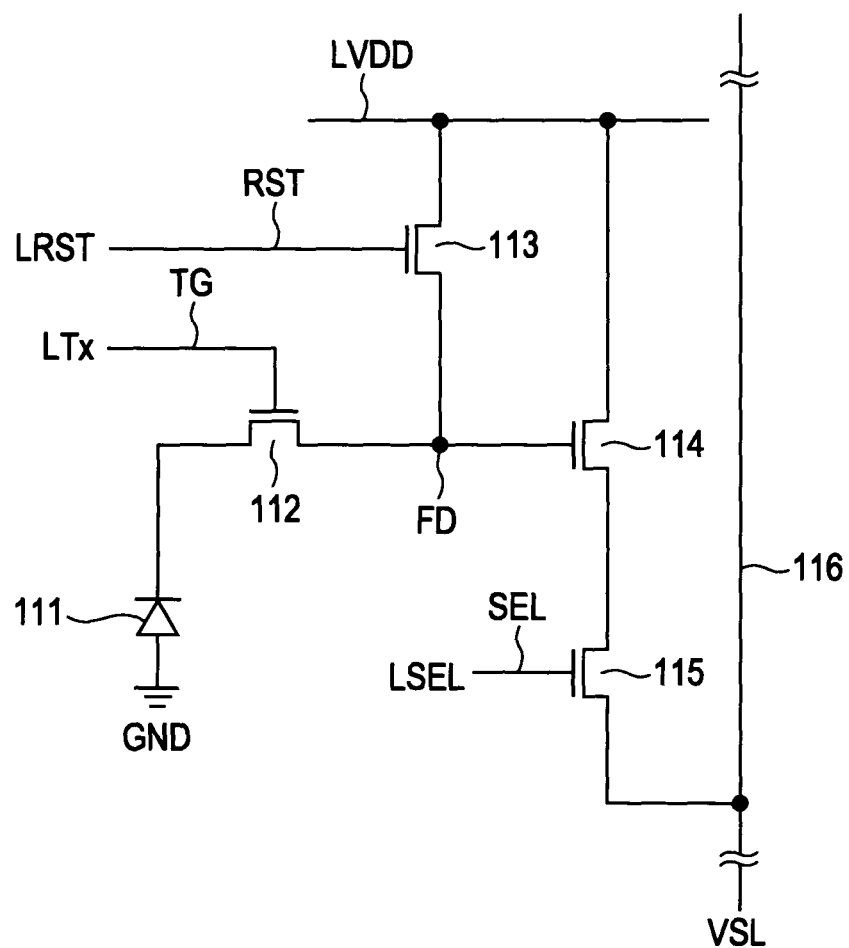
FIG. 4 is a diagram showing an example of a pixel in a CMOS image sensor having four transistors according to the present embodiment.

FIG. 4 is a diagram showing an example of a pixel circuit in a CMOS image sensor having four transistors according to the present embodiment.

The pixel circuit includes a photoelectric conversion element 111 which may be formed of, for example, a photodiode.

The pixel circuit has four transistors as active elements with respect to the photoelectric conversion element 111, namely, a transfer transistor 112, a reset transistor 113, an amplification transistor 114, and a selection transistor 115.

The photoelectric conversion element 111 photoelectrically converts incident light into charge (here, electron) the amount of which corresponds to the amount of light.

The transfer transistor 112 is connected between the photoelectric conversion element 111 and a floating diffusion FD serving as an output node. A transmission signal TG serving as a control signal is supplied to a gate (transfer gate) of the transfer transistor 112 via a transfer control line LTx.

Thus, the transfer transistor 112 transfers the electron photoelectrically converted by the photoelectric conversion element 111 to the floating diffusion FD.

The reset transistor 113 is connected between a power supply line LVDD and the floating diffusion FD, and a reset signal RST serving as a control signal is supplied to a gate of the reset transistor 113 via a reset control line LRST.

Thus, the reset transistor 113 resets the potential of the floating diffusion FD to the potential of the power supply line LVDD.

A gate of the amplification transistor 114 is connected to the floating diffusion FD. The amplification transistor 114 is connected to a vertical signal line 116 through the selection transistor 115, and constitutes a source follower together with a constant current source outside the pixel circuit.

A selection signal SEL serving as a control signal according to an address signal is supplied to a gate of the selection transistor 115 via a selection control line LSEL, and the selection transistor 115 is turned on.

When the selection transistor 115 is turned on, the amplification transistor 114 amplifies the potential of the floating diffusion FD and outputs a voltage corresponding to the amplified potential to the vertical signal line 116. A voltage output from each pixel via the vertical signal line 116 is output to the parallel signal processing circuit 140.

The above operations are performed at the same time on pixels in one row because, for example, the gates of the transfer transistor 112, the reset transistor 113, and the selection transistor 115 are connected to each other row by row.

A set of the reset control line LRST, the transfer control line LTx, and the selection control line LSEL, which are disposed in the pixel array unit 110, is disposed row by row of the pixel array.

The transfer control line LTx and the selection control line LSEL are driven by the row read control circuit 120, and the reset control line LRST is driven by the row reset control circuit 130.

The row read control circuit 120 has a function for specifying a row when the read operation of the CMOS image sensor (solid-state imaging element) 100 is performed.

The row read control circuit 120 has a basic configuration of, for example, an address decoder circuit, and controls the row read of pixels corresponding to the read of a desired row range in the pixel array unit 110.

The row reset control circuit 130 has a function for specifying a row when the shutter operation of the CMOS image sensor (solid-state imaging element) 100 is performed.

The row reset control circuit 130 has a basic configuration of, for example, an address decoder circuit, and resets, concurrently with a row read operation, the charge accumulated by performing photoelectric conversion on pixels in a different row to control the accumulation period of the charge, thereby realizing an electronic shutter.

The parallel signal processing circuit 140 performs processes in parallel, such as noise removal, signal processing, and analog/digital (A/D) conversion, on signals read row by row from the individual pixels of the pixel array unit 110.

The output control circuit 150 is configured to include elements corresponding to individual columns such as horizontal selection switches, horizontal signal lines, horizontal scanning circuits, and amplifying circuits.

The output control circuit 150 has a function for outputting signals for one row, which have been processed in parallel by the parallel signal processing circuit 140, using the horizontal scanning circuits under the horizontal scanning, or sequentially outputting signals only within a desired column range.

In the output control circuit 150, the signals sequentially output from the parallel signal processing circuit 140 are amplified using the amplifying circuits, and are output to outside the chip.

The timing control circuit 160 generates various timing signals according to desired operation modes of the row read control circuit 120, the row reset control circuit 130, the parallel signal processing circuit 140, and the output control circuit 150, and performs timing control for the respective circuits using the respective timing signals.

A specific example configuration of the timing control circuit 160 will be described in detail below.

The CMOS image sensor 100 having the above configuration according to the present embodiment has feature functions below in the window readout for providing cutting and readout of a necessary region.

An overview of the window readout will now be described.

The CMOS image sensor (solid-state imaging element) 100 is configured such that the number of unnecessary output lines to outside the CMOS image sensor 100 can be reduced and blooming can be prevent from occurring in the window readout.

In the CMOS image sensor 100 according to the present embodiment, a window readout position and size can be set in both the effective pixel region 110A and the optical black region 110B.

In a case where the number of output lines to outside the CMOS image sensor 100 is restricted, the CMOS image sensor 100 can select, in a trade-off manner, which of the effective pixel region 110A and the optical black region 110B a larger number of output lines are allocated to.

The CMOS image sensor 100 according to the present embodiment has generally the following two feature functions in the window readout:

(1) Read access or reset access to a row adjacent to a region where the window readout (cutting) is performed is carried out for a period during which the row is output as a blanking line from the CMOS image sensor (solid-state imaging element) 100 (such as a communication period between the solid-state imaging element and the outside).

Thus, the CMOS image sensor 100 sweeps out (discharges) charge in the pixels in the accessed row to prevent blooming from occurring in a region outside the window frame where no shutter or window readout is performed.

(2) The CMOS image sensor 100 according to the present embodiment also performs window cutting on the optical black region 110B as well as the effective pixel region 110A.

In the CMOS image sensor 100, therefore, in a case where the number of output lines to outside the CMOS image sensor 100 is restricted, the number of outputs of the optical black region 110B can be reduced.

Since the number of outputs of the optical black region 110B is reduced, the number of outputs of the effective pixel region 110A can be increased.

Accordingly, the CMOS image sensor 100 according to the present embodiment can perform control to select, in a trade-off manner, which of the effective pixel region 110A and the optical black region 110B a larger size is allocated to in accordance with the output format requested.

It is desirable that the optical black region 110B be set large, for example, when a still image is taken using the same imaging device whereas, when a moving image is taken, the optical black region 110B can be set small.

The CMOS image sensor 100 can also provide the access mentioned in item (1) above to the optical black region 110B where window readout (cutting) has been performed.

More specifically, the CMOS image sensor 100 can provide read access or reset access to a row adjacent to the window readout region (cutting region) in the optical black region 110B for a period during which the row is output as a blanking line (such as a period of communication between the CMOS image sensor 100 and the outside).

Thus, the CMOS image sensor 100 sweeps out (discharges) charge in the pixels in the accessed row to prevent blooming from occurring in a region outside the window frame where no shutter or window readout is performed.

The CMOS image sensor 100 according to the present embodiment performs read access or reset access for preventing blooming for a period of time corresponding to a blanking output period such as a communication period of the CMOS image sensor 100, an analog stability waiting time, or a period of timing adjustment between the sensor 100 and the outside.

The CMOS image sensor 100 accesses the pixel array unit 110 by selecting and switching between the value of a normal read address counter or reset address counter and the value of a blooming-preventing row.

The term "blooming-preventing row", as used herein, refers to a row which is accessed for preventing blooming.

The CMOS image sensor 100 determines the value of a blooming-preventing row (row which is accessed for preventing blooming) using calculation from a window region setting value, direct setting using a register, or any other suitable method.

In the present embodiment, the number of blooming-preventing rows (rows which are accessed for preventing blooming) may be selected from various values such as 0, 1, 2, and 3.

Further, the CMOS image sensor 100 according to the present embodiment is configured to select the window region width of the effective pixel region 110A and the window region width of the optical black region 110B in a trade-off manner in accordance with the purpose of use.

The window readout operation according to the present embodiment is drivingly controlled by the row read control circuit 120 and the row reset control circuit 130 in response to a timing control signal generated by the timing control circuit 160.

An example configuration of the timing control circuit 160 for controlling the timing of the window readout operation according to the present embodiment will now be described.

Figure 5:
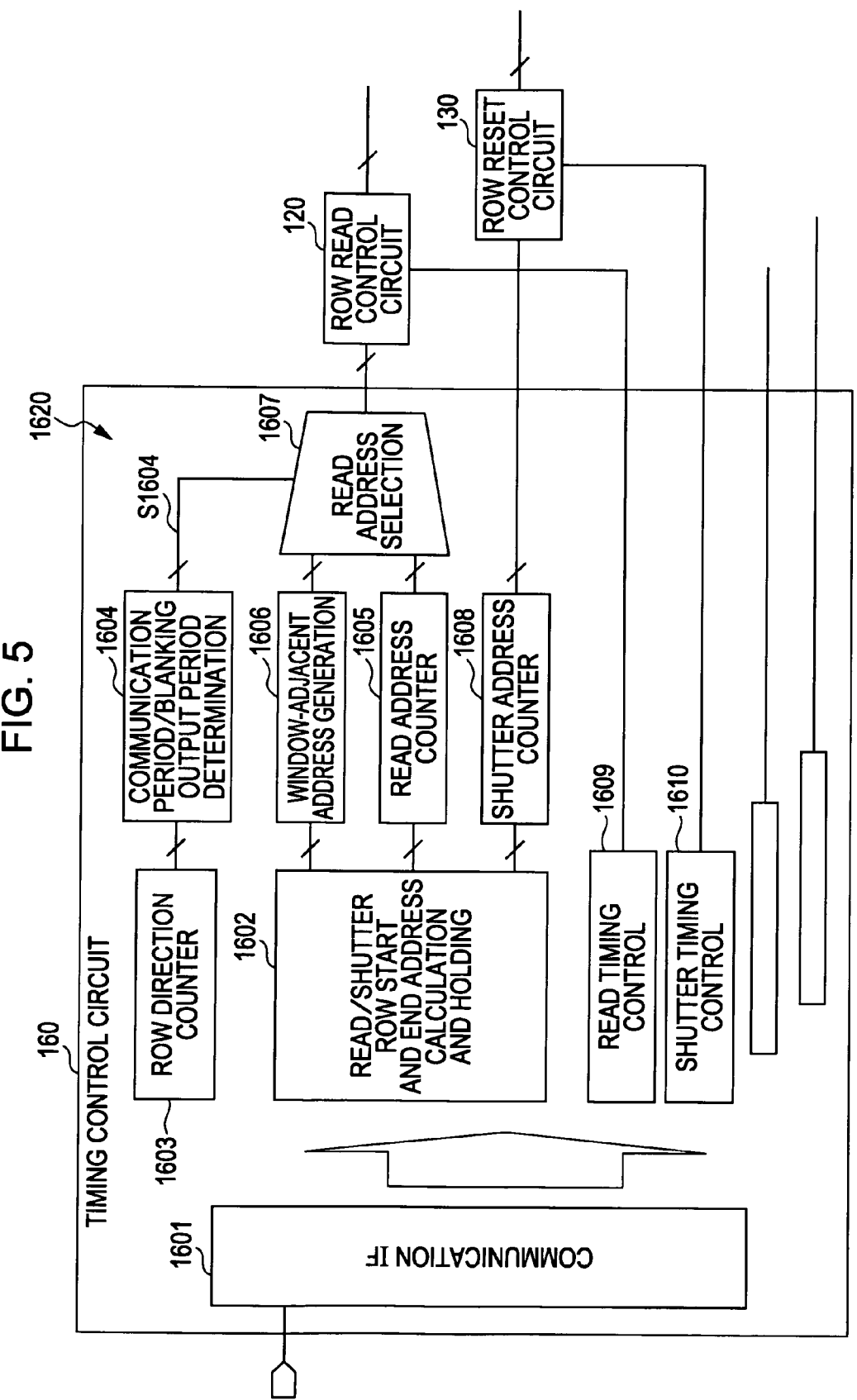
FIG. 5 is a diagram showing an example configuration of a timing control circuit according to the present embodiment.

FIG. 5 is a diagram showing an example configuration of the timing control circuit 160 according to the present embodiment.

As shown in FIG. 5, the timing control circuit 160 includes a communication interface (I/F) 1601, a read/shutter row start and end address calculation and holding unit (hereinafter referred to as an "address calculation and holding unit") 1602, and a row direction counter 1603.

The timing control circuit 160 further includes a communication period/blanking output period determination unit (hereinafter referred to as a "determination unit") 1604, a read address counter 1605, a window-adjacent address generation unit 1606, a read address selection unit 1607, and a shutter address counter 1608.

The timing control circuit 160 further includes a read timing control unit 1609 and a shutter timing control unit 1610.

A read address generation unit 1620 is formed by the address calculation and holding unit 1602, the row direction counter 1603, the determination unit 1604, the read address counter 1605, the window-adjacent address generation unit 1606, and the read address selection unit 1607.

Upon receipt of a command, an access address, or the like supplied from a control unit (not shown), the communication I/F 1601 supplies the command, access address, or the like to necessary portions, that is, the address calculation and holding unit 1602 and the row direction counter 1603.

The address calculation and holding unit 1602 generates a start address Y1 and an end address Y2 of an effective pixel window region EWND in the effective pixel region 110A of the pixel array unit 110, and holds the generated addresses.

The address calculation and holding unit 1602 generates a start address Y3 and an end address Y4 of an optical black window region (hereinafter referred to as an "OB window region") OWND in the optical black region 110B of the pixel array unit 110, and holds the generated addresses.

The address calculation and holding unit 1602 reads the generated start address Y1 and end address Y2 of the effective pixel window region EWND, and outputs the read start address Y1 and end address Y2 to the address counter 1605 and the window-adjacent address generation unit 1606.

The address calculation and holding unit 1602 also reads the generated start address Y3 and end address Y4 of the OB window region OWND, and outputs the read start address Y3 and end address Y4 to the address counter 1605 and the window-adjacent address generation unit 1606.

The row direction counter 1603 counts access addresses in the row direction, and outputs a result to the determination unit 1604.

The determination unit 1604 determines a communication period or a blanking output period on the basis of the output signal of the row direction counter 1603, and outputs a determination result to the read address selection unit 1607 as a determination signal S1604.

Upon receipt of the addresses Y1, Y2, Y3, and Y4 from the address calculation and holding unit 1602, the read address counter 1605 generates access addresses of the effective pixel window region EWND and the OB window region OWND.

The read address counter 1605 outputs the generated access addresses to the read address selection unit 1607.

Upon receipt of the addresses Y1, Y2, Y3, and Y4 from the address calculation and holding unit 1602, the window-adjacent address generation unit 1606 generates adjacent outer row access addresses Y1', Y2', Y3', and Y4'. The adjacent outer row access addresses Y1', Y2', Y3', and Y4' serve to identify one or a plurality of rows outside and adjacent to the effective pixel window region EWND and the OB window region OWND.

The window-adjacent address generation unit 1606 outputs the generated adjacent outer row access addresses Y1', Y2', Y3', and Y4' of the rows outside the effective pixel window region EWND and the OB window region OWND to the read address selection unit 1607.

In accordance with the determination signal S1604 from the determination unit 1604, the read address selection unit 1607 selects the access addresses generated by the read address counter 1605 or the access addresses generated by the window-adjacent address generation unit 1606, and outputs the selected access addresses to the row read control circuit 120.

When the determination signal S1604 indicates a non-blanking-output period, that is, an effective pixel output period, the read address selection unit 1607 selects the access addresses generated by the read address counter 1605, and outputs the access addresses to the row read control circuit 120.

When the determination signal S1604 indicates the blanking output period, the read address selection unit 1607 selects the access addresses generated by the window-adjacent address generation unit 1606, and outputs the access addresses to the row read control circuit 120.

Upon receipt of the addresses Y1, Y2, Y3, and Y4 from the address calculation and holding unit 1602, the shutter address counter 1608 generates shutter access addresses for the effective pixel window region EWND and the OB window region OWND.

The shutter address counter 1608 outputs the generated shutter access addresses to the row reset control circuit 130.

The read timing control unit 1609 controls the read timing of the row read control circuit 120.

The shutter timing control unit 1610 controls the row reset timing of the row reset control circuit 130.

Figure 6:
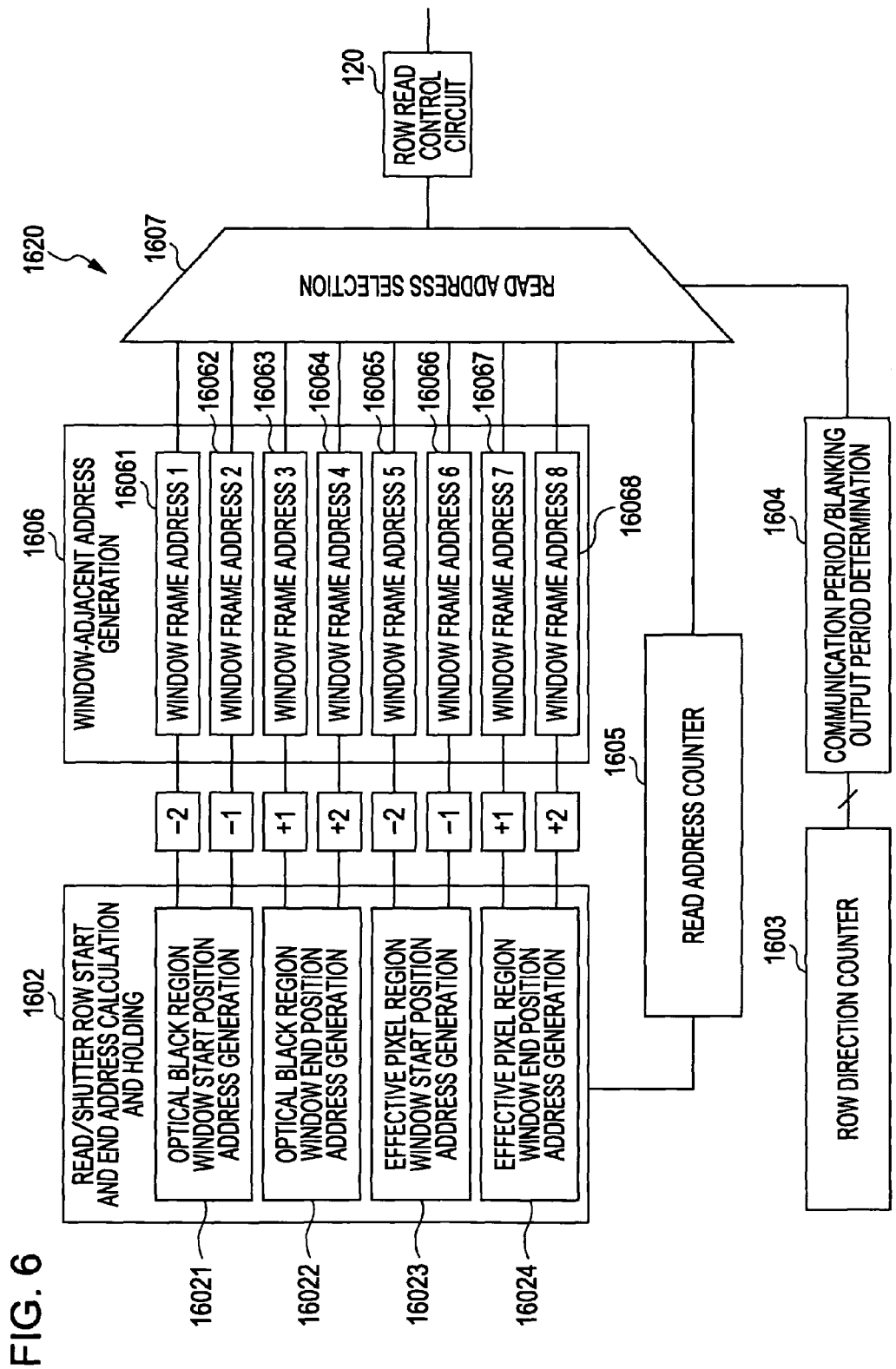
FIG. 6 is a diagram showing an example configuration of a read address generation unit according to the present embodiment.

FIG. 6 is a diagram showing an example configuration of the read address generation unit 1620 according to the present embodiment.

The read address generation unit 1620 is formed by the address calculation and holding unit 1602, the row direction counter 1603, the determination unit 1604, the read address counter 1605, the window-adjacent address generation unit 1606, and the read address selection unit 1607.

Referring to FIG. 6, the address calculation and holding unit 1602 includes an optical black region window (hereinafter referred to as an "OB region window") start position address generation unit 16021, and an OB region window end position address generation unit 16022.

The address calculation and holding unit 1602 further has an effective pixel region window start position address generation unit 16023, and an effective pixel region window end position address generation unit 16024.

The OB region window start position address generation unit 16021 generates the start address Y3 of the OB window region OWND.

The OB region window end position address generation unit 16022 generates the end address Y4 of the OB window region OWND.

The effective pixel region window start position address generation unit 16023 generates the start address Y1 of the effective pixel window region EWND.

The effective pixel region window end position address generation unit 16024 generates the end address Y2 of the effective pixel window region EWND.

Referring to FIG. 6, the window-adjacent address generation unit 1606 includes window frame address generation units 16061 to 16068.

In this example, addresses of adjacent two rows are generated by way of example.

The window frame address generation unit 16061 generates window frame address 1 in response to an address given by subtracting 2 from the start address Y3 of the OB window region OWND generated by the OB region window start position address generation unit 16021.

The window frame address generation unit 16062 generates window frame address 2 in response to an address given by subtracting 1 from the start address Y3 of the OB window region OWND generated by the OB region window start position address generation unit 16021.

The window frame address generation unit 16063 generates window frame address 3 in response to an address given by adding 1 to the end address Y4 of the OB window region OWND generated by the OB region window start position address generation unit 16021.

The window frame address generation unit 16064 generates window frame address 4 in response to an address given by adding 2 to the end address Y4 of the OB window region OWND generated by the OB region window start position address generation unit 16021.

The window frame address generation unit 16065 generates window frame address 5 in response to an address given by subtracting 2 from the start address Y1 of the effective pixel window region EWND generated by the effective pixel region window start position address generation unit 16023.

The window frame address generation unit 16066 generates window frame address 6 in response to an address given by subtracting 1 from the start address Y1 of the effective pixel window region EWND generated by the effective pixel region window start position address generation unit 16023.

The window frame address generation unit 16067 generates window frame address 7 in response to an address given by adding 1 to the end address Y2 of the effective pixel window region EWND generated by the effective pixel region window end position address generation unit 16024.

The window frame address generation unit 16068 generates window frame address 8 in response to an address given by adding 2 to the end address Y2 of the effective pixel window region EWND generated by the effective pixel region window end position address generation unit 16024.

Accordingly, the window-adjacent address generation unit 1606 calculates window frame addresses based on the setting values of the window regions.

Figure 7:
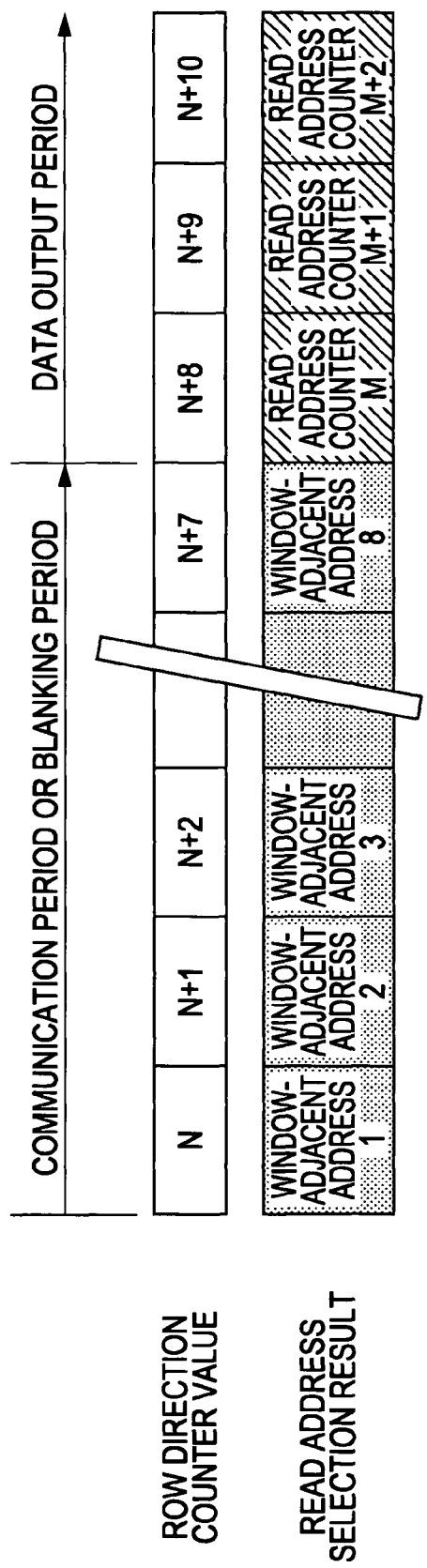
FIG. 7 is a diagram showing an example of a selection result of a read address.

FIG. 7 is a diagram showing an example of a selection result of a read address.

In the example shown in FIG. 7, when the row direction counter 1603 has count value N, the read address is the address generated by the window frame address generation unit 16061.

When the row direction counter 1603 has count value N+1, the read address is the address generated by the window frame address generation unit 16062.

When the row direction counter 1603 has count value N+2, the read address is the address generated by the window frame address generation unit 16063.

Likewise, when the row direction counter 1603 has count value N+7, the read address is the address generated by the window frame address generation unit 16068.

When the row direction counter 1603 has count value N+8, address M of the read address counter 1605 is selected.

When the row direction counter 1603 has count value N+9, address M+1 of the read address counter 1605 is selected.

When the row direction counter 1603 has count value N+10, address M+2 of the read address counter 1605 is selected.

Next, the operation with the above configuration will be described with reference to FIGS. 3 and 8 and any other suitable figure.

The CMOS image sensor 100 which may be an X-Y addressing solid-state imaging element reads the two-dimensionally disposed pixels on a row-by-row basis, and performs a shutter (reset) operation.

Under the control of the timing control circuit 160, the row read control circuit 120 and the row reset control circuit 130 perform drive control to set a window cutting and readout region in the effective pixel region 110A of the pixel array unit 110 as the addresses Y1 and Y2.

In addition, under the control of the timing control circuit 160, the row read control circuit 120 and the row reset control circuit 130 perform drive control to set a window cutting and readout region in the optical black region 110B as the addresses Y3 and Y4.

The window cutting position and size of each of the effective pixel region 110A and the optical black region 110B can be set to desired values in accordance with the number of output lines requested.

This allows selection of effective pixel output rows and optical black output rows in an trade-off manner.

The read and reset scanning to the pixel array unit 110 is performed in a manner indicated by "<1> pixel row access scan" and "<2> pixel row access scan" in FIG. 3.

A data image output from the CMOS image sensor 100 is shown in the right part of FIG. 3.

An image output from the CMOS image sensor 100 also includes a front blank portion FBLK and a rear blank portion RBLK.

The blanking periods corresponding to the front blank portion FBLK and the rear blank portion RBLK are caused due to the communication period between the CMOS image sensor (solid-state imaging element) 100 and the outside, the waiting time for stabilizing the internal circuit after the settings of the solid-state imaging device, such as the gain value, have been changed, and the timing adjustment between the CMOS image sensor 100 and the outside.

The rows adjacent to the effective pixel window region EWND, which are identified by the adjacent outer row access addresses Y1' and Y2', and the rows adjacent to the OB window region OWND, which are identified by the adjacent outer row access addresses Y3' and Y4', are read and accessed during the blanking output period.

In the read and accessed rows, charge is swept out, and the overflow of charge to the window regions can be prevented.

This can avoid unnecessary output lines to outside, and can prevent blooming from occurring in a region A or B that is not accessed.

Figure 8:
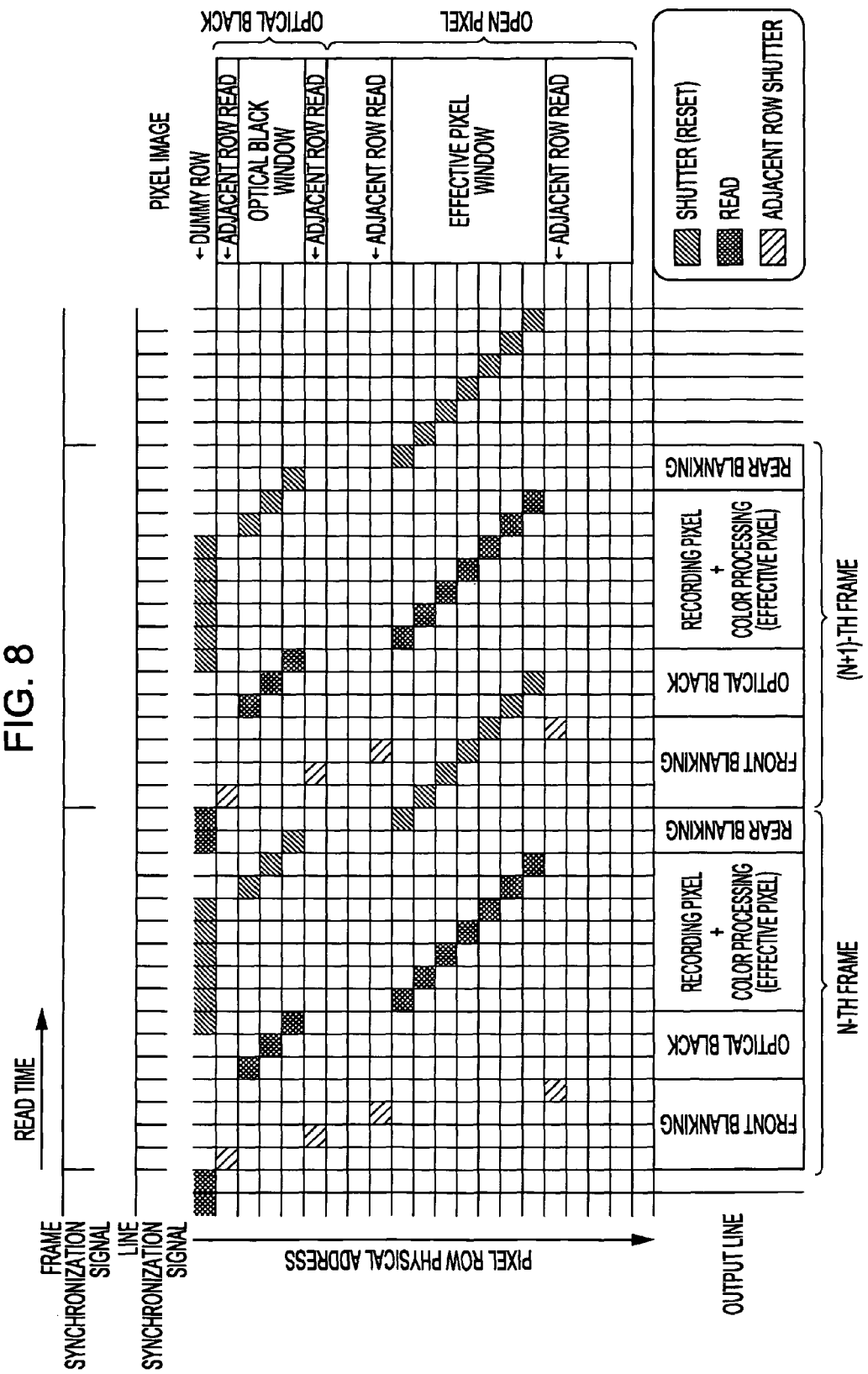
FIG. 8 is a diagram showing an example of pixel line access of the CMOS image sensor according to the embodiment.

FIG. 8 shows an overview of pixel readout, shutter (reset) access, and output.

In this case, the frame of the window regions is accessed and reset during a blanking output period to outside in order to prevent blooming. The frame of the window regions is not output to the outside.

In this example, the frame is reset by using the read operation by way of example.

Although the optical black region 110B, which is blocked from light, does not usually have the problem of blooming, the effect of the blooming in the region A of the effective pixel region 110A, which propagates to the optical black region 110B, on the address Y4 of the OB window region OWND can be prevented.

Furthermore, the effect of unwanted flow of charge from outside the pixel array unit 110 (in FIG. 3, the upper portion of the pixel array unit 110) on the address Y3 of the OB window region OWND can be prevented.

Note that the rows identified by the adjacent outer row access addresses Y3' and Y4' are also accessed for preventing blooming in order to prevent blooming or the like from occurring in the optical black region 110B when strong light that can pass through a light-blocking element enters the optical black region 110B.

The number of access rows for preventing blooming, which are identified by the addresses Y1', Y2', Y3', and Y4', is variable.

First Exemplary Modification

Figure 9:
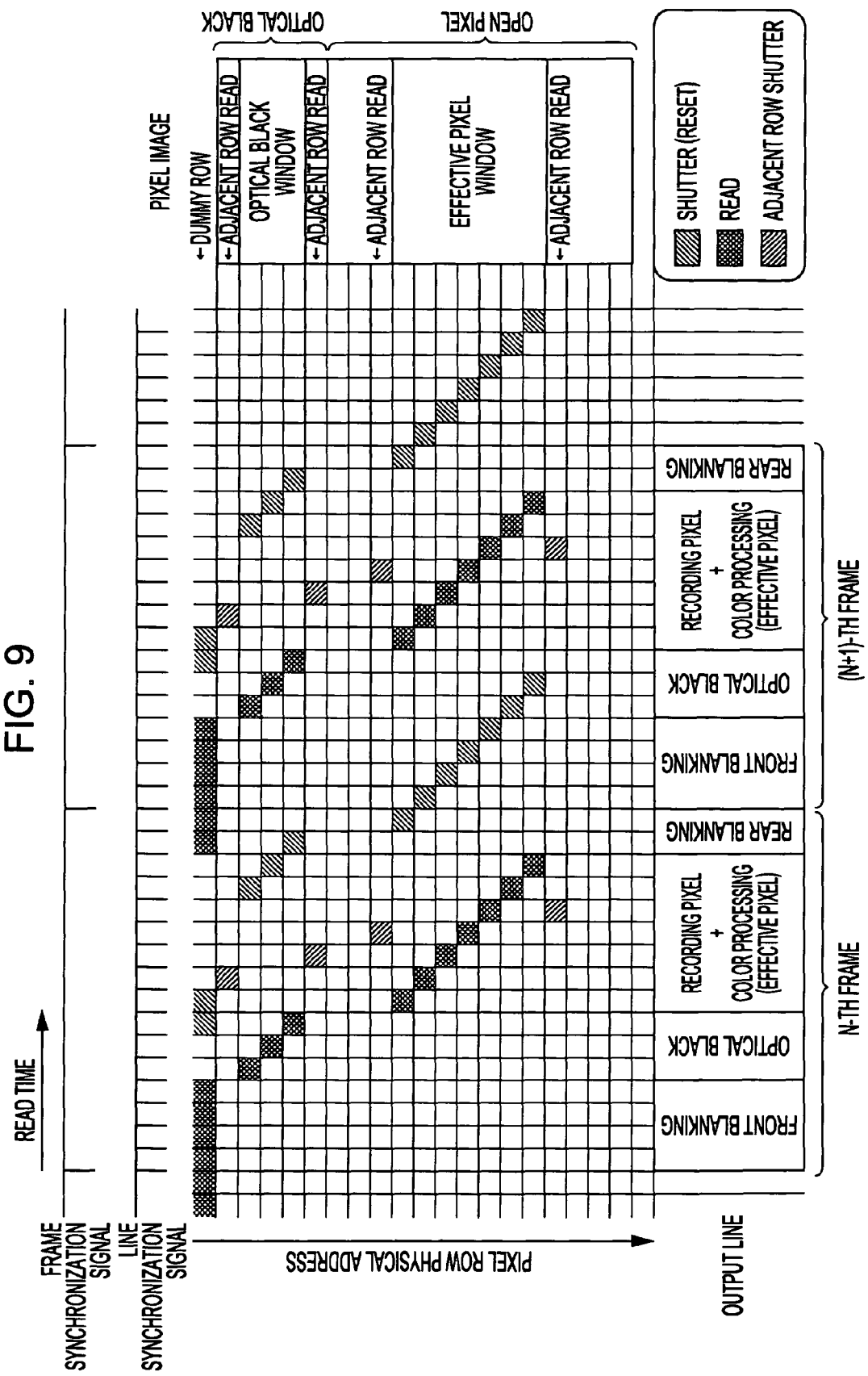
FIG. 9 is a diagram showing a first exemplary modification of pixel row access for preventing blooming in the CMOS image sensor according to the embodiment.

FIG. 9 is a diagram showing a first exemplary modification of pixel row access for preventing blooming in a CMOS image sensor according to the present embodiment.

In the embodiment described above, access to a row adjacent to a window region for preventing blooming is performed using the read operation. However, as shown in FIG. 9, the access may also be performed using shutter (reset) access.

Also in this case, the frame of the window regions is accessed and reset during a blanking output period to outside for preventing blooming. The frame of the window regions is not output to the outside.

In this example, the frame of the window regions is reset using the shutter operation.

Second Exemplary Modification

Figure 10:
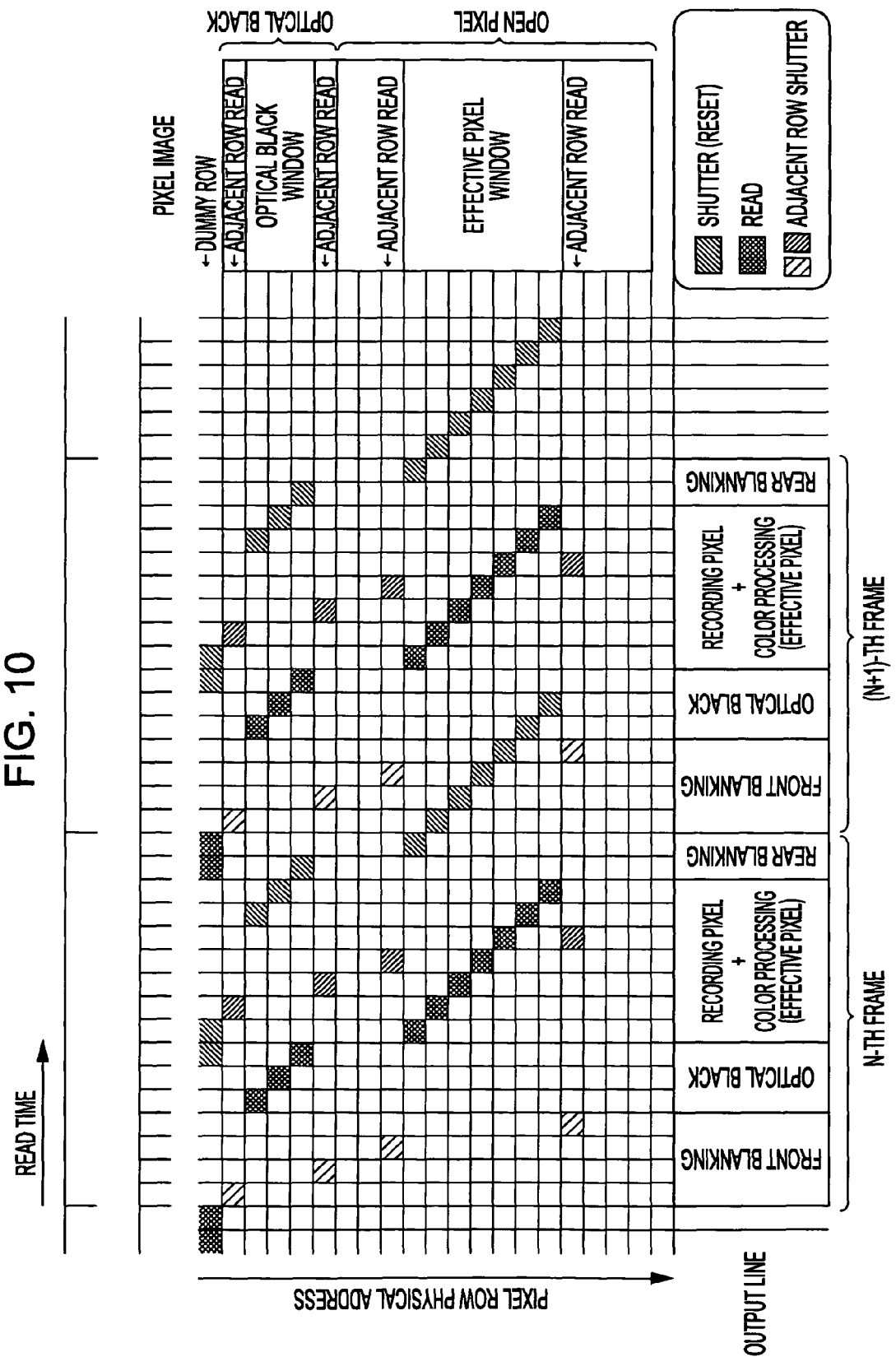
FIG. 10 is a diagram showing a second exemplary modification of pixel row access for preventing blooming in the CMOS image sensor according to the embodiment.

FIG. 10 is a diagram showing a second exemplary modification of pixel row access for preventing blooming in the CMOS image sensor according to the present embodiment.

In the embodiment described above, access to a row adjacent to a window region for preventing blooming is performed using only the read operation. However, the access may also be performed using read access and shutter (reset) access.

Third Exemplary Modification

In FIG. 3, the optical black region 110B can be set to 0 (no output).

Fourth Exemplary Modification

In FIG. 3, the optical black region 110B can also be provided along the lower side as well as the upper side of the pixel array unit 110 in FIG. 3.

In this case, a window region can also be set in the optical black region provided along the lower side of the pixel array unit 110.

Fifth Exemplary Modification

In FIG. 3, optical black regions can also be provided along the right and left sides of the pixel array unit 110 in FIG. 3.

In this case, data of the optical black regions can also be output as the output data in the horizontal direction. In this case, the data of horizontal optical black regions is output to both the right and left sides of the data image shown in the right part of FIG. 3.

Sixth Exemplary Modification

FIG. 3 shows up-to-down pixel scanning in FIG. 3. In the reverse readout, down-to-up scanning can also be performed.

Seventh Exemplary Modification

In FIG. 6, window-adjacent address values are determined by calculation from the values of the window positions. Alternatively, window-adjacent address values can also be directly set by register setting or the like.

Eighth Exemplary Modification

In FIG. 6, each end has two window-adjacent address values. Alternatively, each end can have one or more than two window-adjacent address values.

Also in this case, the number of access rows identified by the adjacent outer row access addresses Y1', Y2', Y3', and Y4' for preventing blooming can be controlled.

Second Embodiment

Figure 11:
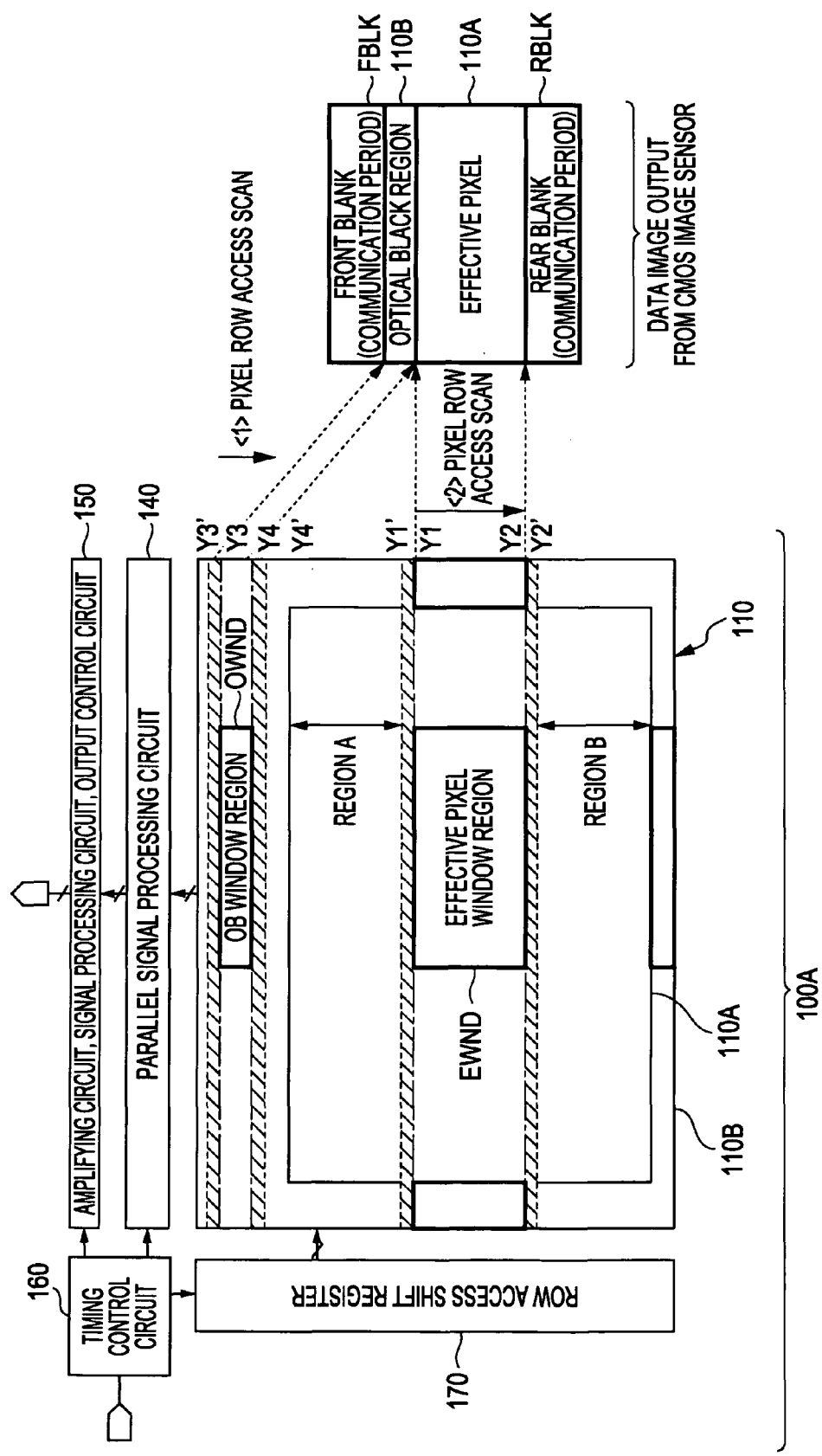
FIG. 11 is a diagram showing an example configuration of a CMOS image sensor (solid-state imaging element) according to a second embodiment of the present invention.

FIG. 11 is a diagram showing an example configuration of a CMOS image sensor (solid-state imaging element) 100A according to a second embodiment of the present invention.

The CMOS image sensor 100A according to the second embodiment is different from the CMOS image sensor 100 according to the first embodiment in that a row access shift register 170 is arranged in place of the row read control circuit 120 and row reset control circuit 130 shown in FIG. 3.

Also in the second embodiment, the timing control circuit 160 controls the row access shift register 170 using a method similar to that in the first embodiment, thereby achieving the same or similar advantages.

According to the present embodiment, therefore, the following advantages can be achieved.

(1) Read access or shutter (reset) access to a row adjacent to a window region can be carried out to prevent blooming.

The access to an adjacent row is performed for a period during which blanking data is output to the outside. This can avoid the blooming problem without using unnecessary output lines to outside the solid-state imaging element.

Figure 1:
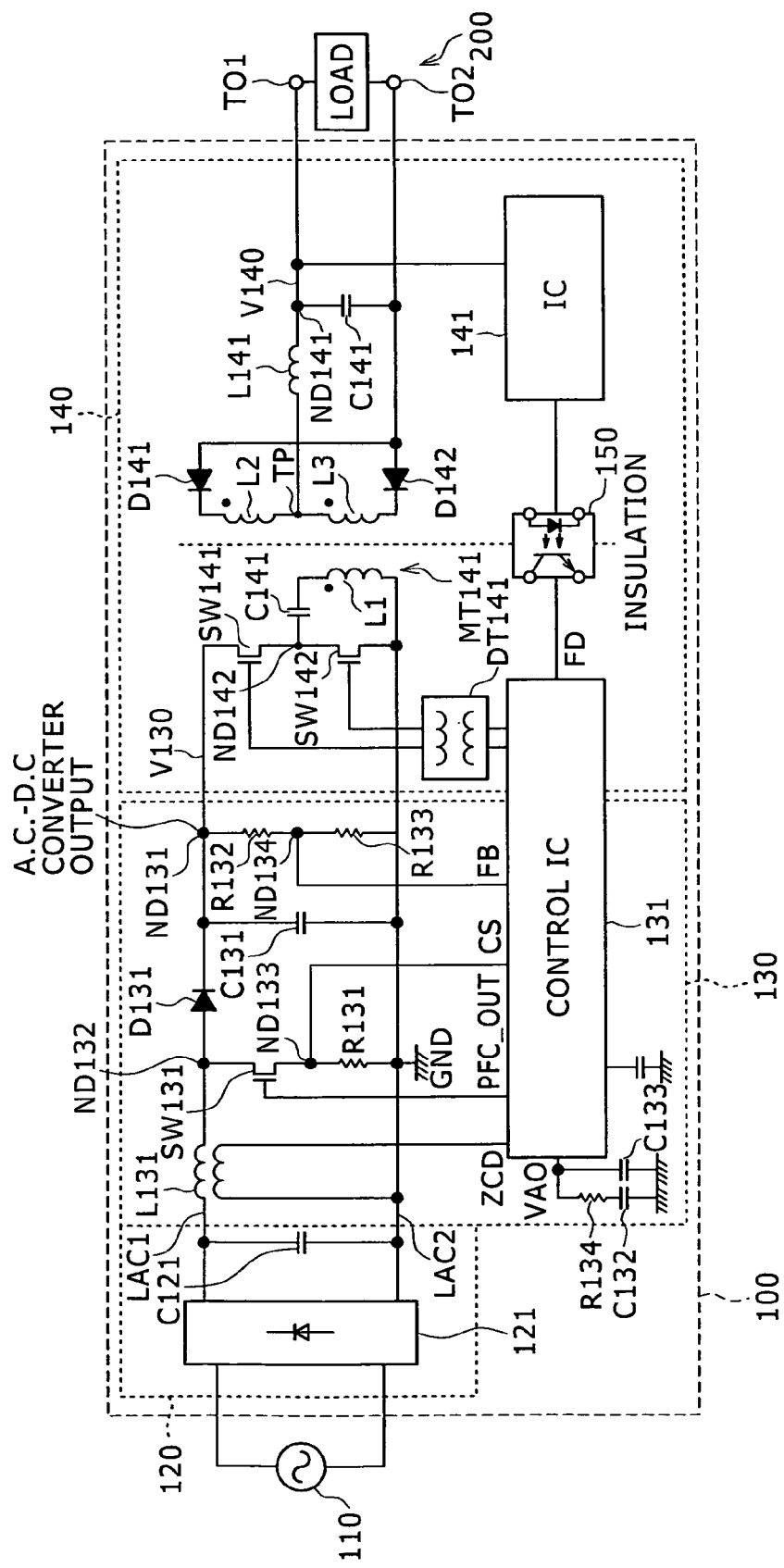
FIG. 1 is a diagram explaining an example of window readout of a typical CMOS image sensor (solid-state imaging element)
Figure 2:
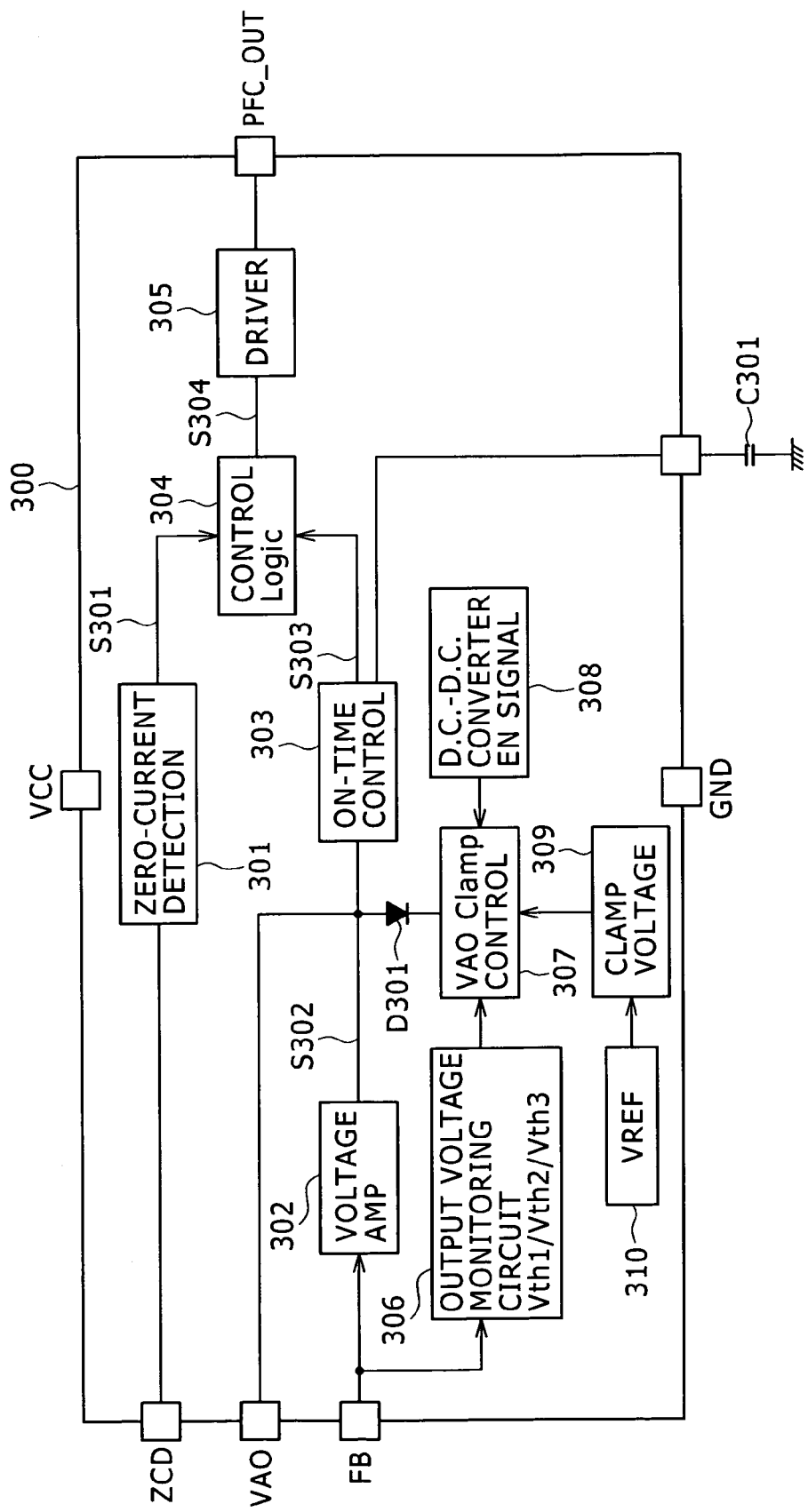
FIG. 2 is a diagram showing an example of pixel line access of a typical CMOS image sensor.

The window readout in a normal solid-state imaging element involves the number of output lines shown in FIG. 1. According to the present embodiment, the number of output lines can be reduced to that shown in FIG. 12.

Figure 12:
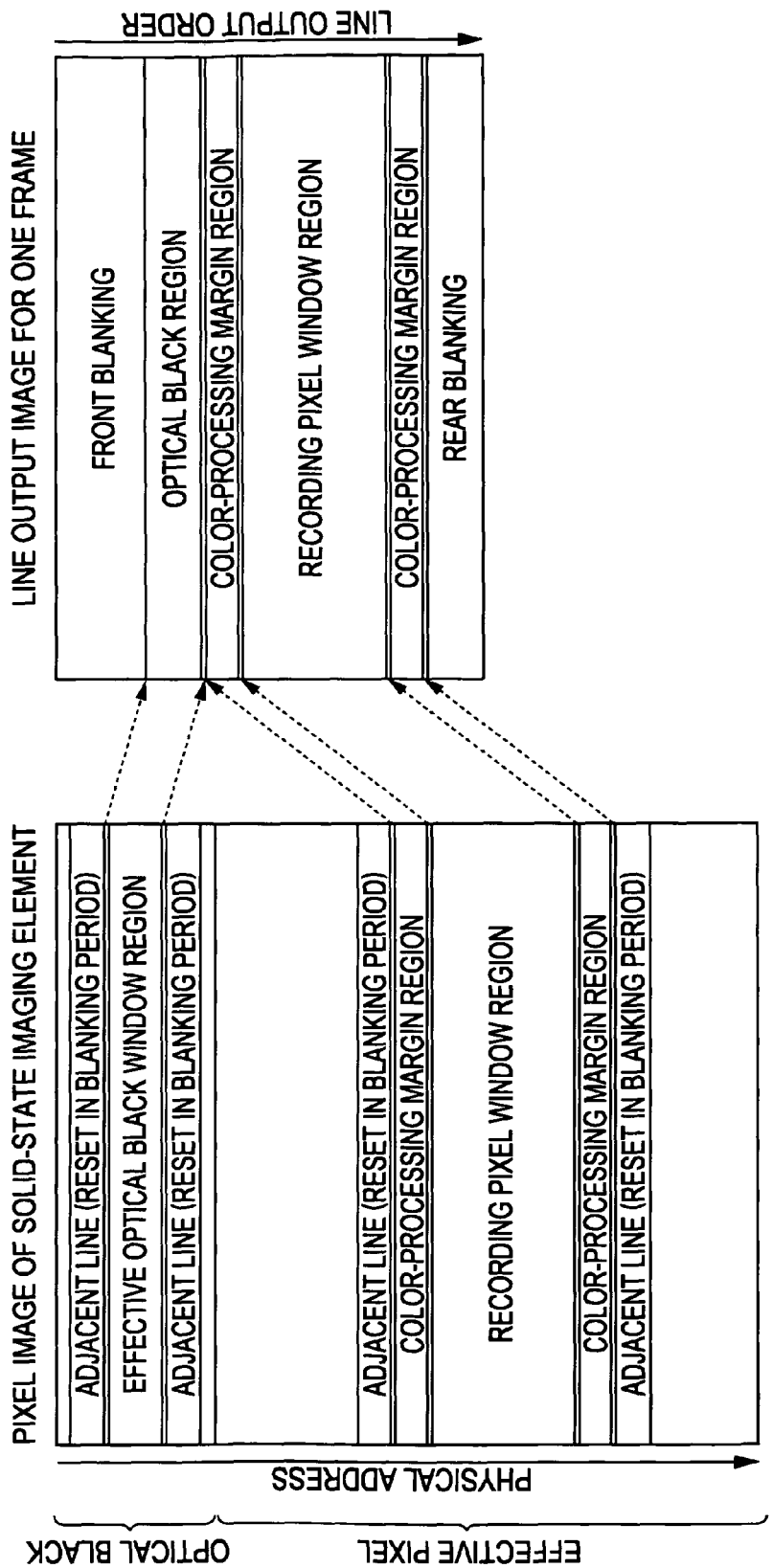
FIG. 12 is a diagram showing an example image of output lines according to the second embodiment of the present invention.

In the example shown in FIG. 12, a window region can also be set in an optical black region. Window regions are set in both a recording pixel region and an optical black region. Since the frame of the window region is accessed and reset for a blanking output period to outside for preventing blooming, the data of the frame of the window region is not output to the outside.

Accordingly, in a case where the number of output lines per frame is restricted, a large number of effective pixel output lines can be used.

(2) Since the window cutting is also performed in the optical black region, the position and size of the optical black region are variable, resulting in a variable number of output lines of the optical black region to outside.

This allows a trade-off between the number of effective pixel lines and the number of optical black lines when the number of output lines per frame is restricted.

For example, there is a demand for a large number of optical black lines for photographing still images and a reduced number of optical black lines for photographing moving images. There is another demand for a large color-processing margin region in an effective pixel.

Figure 13:
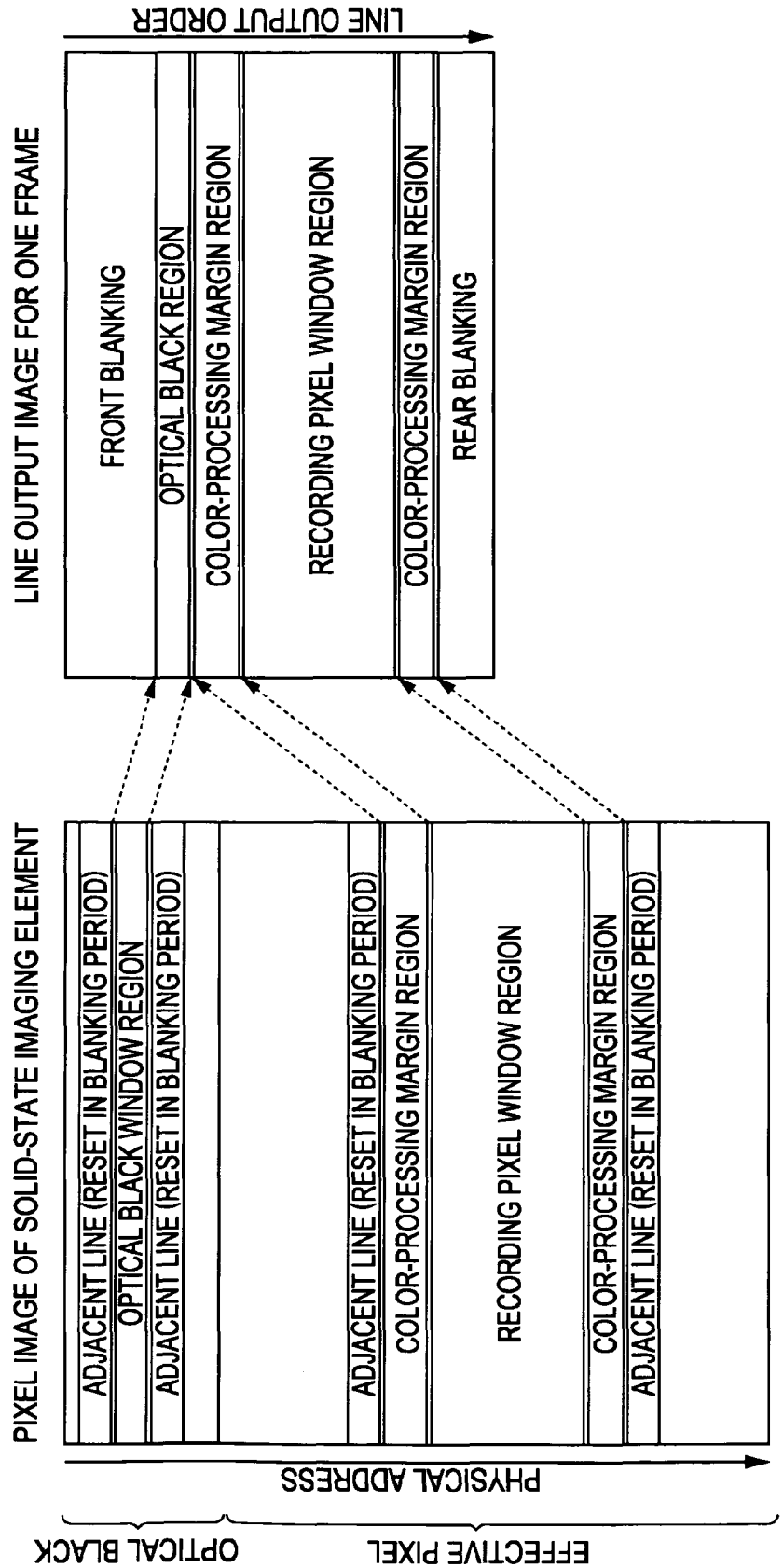
FIG. 13 is a diagram showing another example image of output lines according to the second embodiment of the present invention.

In this case, the number of output lines can be changed from that shown in FIG. 12 to that shown in FIG. 13.

The selection of the number of lines in the color-processing margin regions of recording pixels and the number of lines in the optical black region can be performed so that a trade-off can be made therebetween.

In the example shown in FIG. 13, as compared with the example shown in FIG. 12, the number of lines in the optical black region is reduced while the number of lines in the color-processing margin region is increased, by way of example. The selection of the number of lines in the color-processing margin region and the number of lines in the optical black region can be performed so that a trade-off can be made therebetween without changing the number of output lines to outside.

(3) The advantages given in items (1) and (2) above can overcome the blooming problem involved in the window cutting and readout to support the output format with a smaller number of pixel rows than the number of pixel rows of a pixel array included in a solid-state imaging element.

In addition, an output format with a limited number of output lines, an output format that uses a large number of effective pixels, and an output format that uses a large optical black region can be supported.

Therefore, a solid-state imaging element capable of supporting a variety of output formats can be achieved.

In the present embodiment, furthermore, a pixel array control circuit may not necessarily include the "row read control circuit 12", the "row reset control circuit 13", and the "non-access row reset control circuit 14", which are used in Japanese Unexamined Patent Application Publication No. 2006-310932.

More specifically, in the present embodiment, a pixel array control circuit may include only the "row read control circuit 120" and the "row reset control circuit 130". That is, the "non-access row reset control circuit 14" is not necessary.

The reason is that a solid-state imaging element performs read row access or reset access to a blooming-preventing row during a blanking row output period while accessing an address only by temporally switching between the normal read and shutter address values and the blooming-preventing access row value.

The CMOS image sensors according to the individual embodiments are not construed in a limiting sense, and may be configured as, for example, a CMOS image sensor having a column-parallel analog-digital converter (ADC) structure.

Third Embodiment

Figure 14:
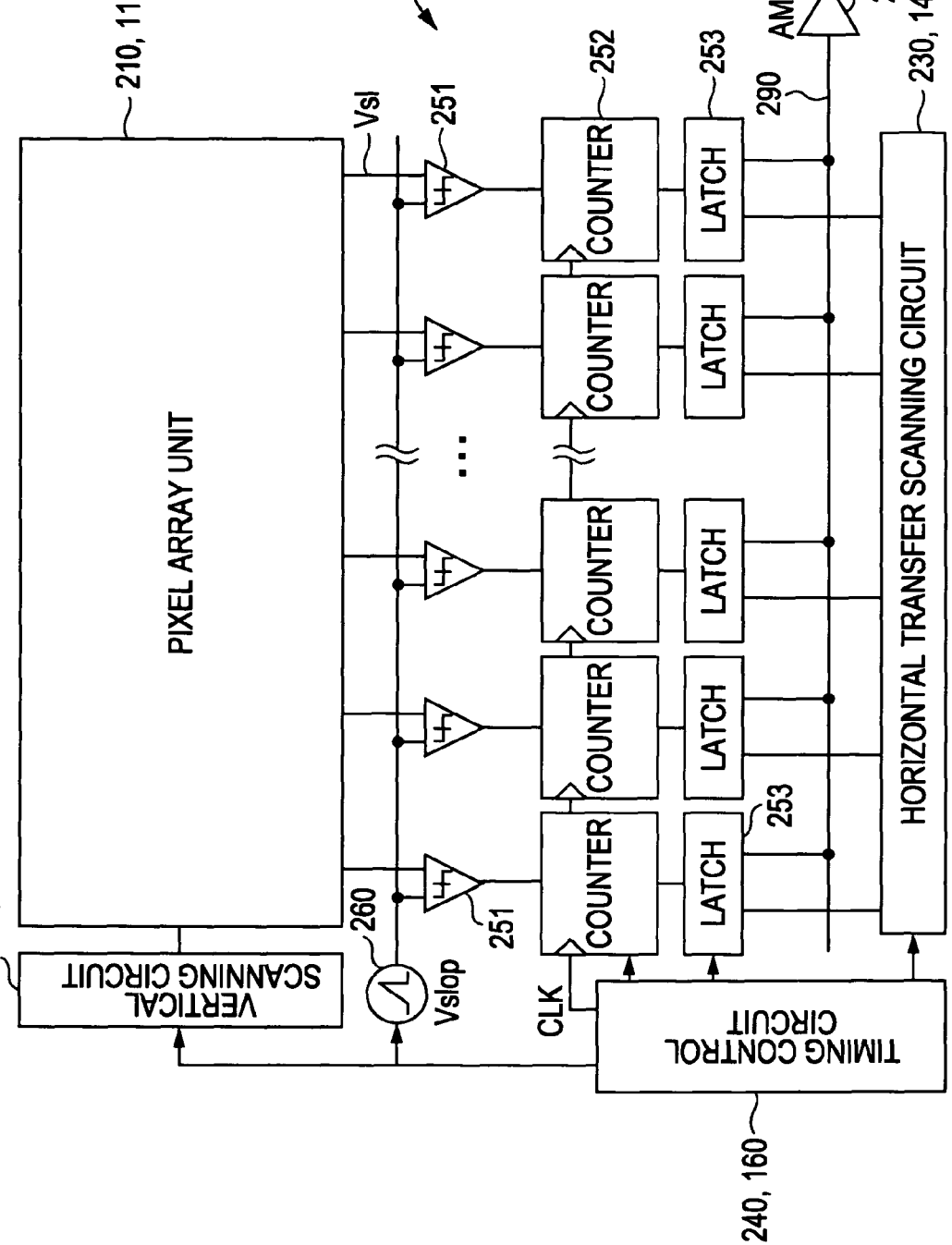
FIG. 14 is a diagram showing an example configuration of a solid-state imaging element (CMOS image sensor) having a column-parallel ADC structure according to a third embodiment of the present invention.

FIG. 14 is a diagram showing an example configuration of a solid-state imaging element (CMOS image sensor) 200 having a column-parallel ADC structure according to a third embodiment of the present invention.

As shown in FIG. 14, the solid-state imaging element 200 includes a pixel array unit 210 which may serve as an imaging unit, a vertical scanning circuit 220, a horizontal transfer scanning circuit 230, and a timing control circuit 240. The vertical scanning circuit 220, the horizontal transfer scanning circuit 230, and the timing control circuit 240 may serve as a pixel driving unit (pixel array control circuit).

The solid-state imaging element 200 further includes an ADC group 250, a digital-analog converter (DAC) 260, an amplifying circuit (signal amplifier (S/A)) 270, and a signal processing circuit 280.

In the above configuration, the vertical scanning circuit 220 has functions corresponding to the functions of the row read control circuit 120 and the row reset control circuit 130 shown in FIG. 3 or the functions of the row access shift register 170 shown in FIG. 11.

The timing control circuit 240 may correspond to the timing control circuit 160 shown in FIGS. 3 and 11.

The ADC group 250, the DAC 260, the amplifying circuit (S/A) 270, and the signal processing circuit 280 of the solid-state imaging element 200 may correspond to the parallel signal processing circuit 140 and output control circuit 150 shown in FIGS. 3 and 11.

The pixel array unit 210 is configured such that pixels each including a photodiode and an in-pixel amplifier, for example, the pixels shown in FIG. 8, are arranged in a matrix.

The solid-state imaging element 200 further includes the following circuits as a control circuit for sequentially reading signals of the pixel array unit 210.

The solid-state imaging element 200 is provided with the timing control circuit 240 serving as a control circuit and configured to generate an internal clock, the vertical scanning circuit 220 configured to control row addresses or row scanning, and the horizontal transfer scanning circuit 230 configured to control column addresses or column scanning.

The ADC group 250 has a plurality of ADCs each including a comparator 251, a counter 252, and a latch 253.

The comparators 251 compare a reference voltage Vslop having a ramp waveform (RAMP) in which a reference voltage is changed stepwise, which is generated by the DAC 260, with analog signals obtained from pixel for each row line via vertical signal lines.

The counters 252 count the comparison times of the comparators 251.

The ADCs in the ADC group 250 have the n-bit digital signal conversion function, and are provided for the individual vertical signal lines (column lines), thereby forming column-parallel ADC blocks.

The outputs of the latches 253 are connected to a horizontal transfer line 290 having a width of, for example, 2n bits.

Further, 2n amplifying circuits 270 corresponding to the horizontal transfer line 290 and the signal processing circuit 280 are provided.

In the ADC group 250, analog signals (potential Vsl) read to the vertical signal lines are compared with the reference voltage Vslop (slope waveform that is linearly changed to a line having a certain inclination) using the comparators 251 provided for the individual columns.

At this time, the counters 252, which are provided for the individual columns in a manner similar to that of the comparators 251, are operating. The potential Vslop having the ramp waveform and the counter values are changed in a one-to-one correspondence manner, thereby converting the potentials (analog signals) Vsl in the vertical signal lines into digital signals.

The change in the reference voltage Vslop allows the change in voltage to be converted into the change in time. The time is counted in a certain cycle (clock), and the count value is therefore converted into a digital value.

When the analog electrical signals Vsl match the reference voltage Vslop, the outputs of the comparators 251 are inverted, and the input clock of the counters 252 is stopped. Accordingly, AD conversion is completed.

After the completion of the AD conversion period described above, the horizontal transfer scanning circuit 230 allows the data held in the latches 253 to be input to the signal processing circuit 280 through the horizontal transfer line 290 and the amplifying circuits 270. Thus, a two-dimensional image is generated.

In this way, the column parallel output process is performed.

A solid-state imaging element having the above advantages can be used as an imaging device in a digital camera or a video camera.

Fourth Embodiment

Figure 15:
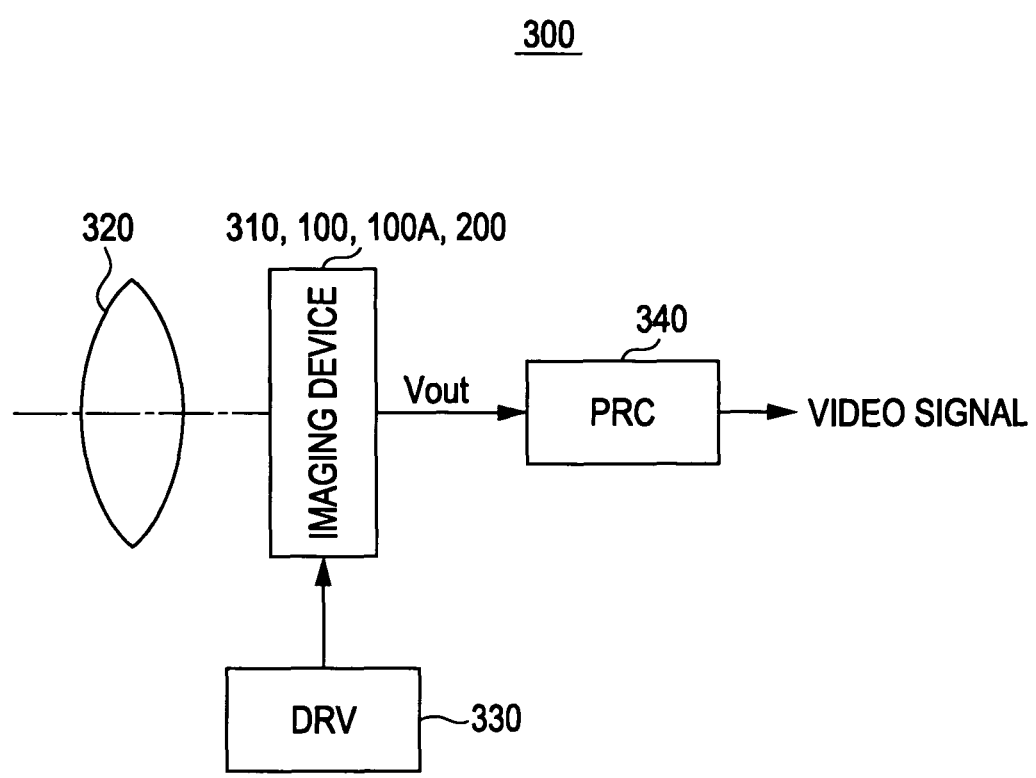
FIG. 15 is a diagram showing an example configuration of a camera system including a solid-state imaging element according to a fourth embodiment of the present invention.

FIG. 15 is a diagram showing an example configuration of a camera system 300 including a solid-state imaging element according to a fourth embodiment of the present invention.

As shown in FIG. 15, the camera system 300 includes an imaging device 310 which may be implemented by any of the CMOS image sensors (solid-state imaging elements) 100, 100A, and 200 according to the foregoing embodiments.

The camera system 300 further includes an optical system configured to direct incident light to a pixel region of the imaging device 310 (form a subject image), for example, a lens 320 configured to focus the incident light (image light) onto an imaging surface to form an image.

The camera system 300 further includes a driving circuit (DRV) 330 configured to drive the imaging device 310, and a signal processing circuit (PRC) 340 configured to process an output signal Vout of the imaging device 310.

The driving circuit 330 includes a timing generator (not shown) configured to generate various timing signals including a start pulse and clock pulse for driving circuits in the imaging device 310 so that the imaging device 310 can be driven by a predetermined timing signal.

The signal processing circuit 340 performs predetermined signal processing on the output signal Vout of the imaging device 310.

An image signal processed by the signal processing circuit 340 is recorded on a recording medium such as a memory. Image information recorded on the recording medium is "hard copied" using a printer or the like. The image signal processed by the signal processing circuit 340 is further displayed as a moving image on a monitor such as a liquid crystal display.

As described above, the imaging element 100, 100A, or 200 described above can be mounted as the imaging device 310 in an imaging apparatus such as a digital still camera. Therefore, a camera with low power consumption and high performance can be realized.

The present application contains subject matter related to that disclosed in Japanese Priority Patent Application JP 2008-258698 filed in the Japan Patent Office on Oct. 3, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging element comprising:
a pixel array unit having
pixels arranged in a matrix, each pixel including a photoelectric conversion element,
an effective pixel region, and
an optical black region disposed adjacent to the effective pixel region; and
a pixel drive control unit configured to control driving of the pixel array unit so as to perform a read or reset access operation of the pixel array unit in accordance with specified address information,
wherein the pixel drive control unit sets a desired region in the pixel array unit as a window region to be accessed, and
wherein the pixel drive control unit performs, concurrently with access to the window region and an output processing, the read or reset access operation on an adjacent row located between the window region and the optical black region, the adjacent row spanning an entire row of pixels in the matrix and not being a part of the window region and the optical black region.

2. The solid-state imaging element according to claim 1, wherein the pixel drive control unit sets the window region in at least the effective pixel region.

3. The solid-state imaging element according to claim 1, wherein the read or reset access on the adjacent row is performed during a blanking output period.

4. The solid-state imaging element according to claim 1, wherein the pixel drive control unit includes
a read address counter configured to generate a read address, a reset address counter configured to generate a reset address, and a window-adjacent address generation unit configured to generate an address of the adjacent row, and wherein access to the pixel array unit is performed by selectively switching between the address generated by the read address counter or the reset address counter and the address of the adjacent row generated by the window-adjacent address generation unit.

5. The solid-state imaging element according to claim 4, wherein the pixel drive control unit determines the address of the adjacent row generated by the window-adjacent address generation unit using calculation from a setting value of the window region.

6. The solid-state imaging element according to claim 4, wherein the pixel drive control unit sets the address of the adjacent row generated by the window-adjacent address generation unit.

7. The solid-state imaging element according to claim 4, wherein the pixel drive control unit selects the address generated by the window-adjacent address generation unit during a blanking period, and selects the address generated by the read address counter during an effective pixel output period.

8. The solid-state imaging element according to claim 1, wherein the pixel drive control unit sets the window region in the effective pixel region and the optical black region, and wherein the pixel drive control unit selects a width of a window region in the effective pixel region and a width of a window region in the optical black region so that a trade-off can be made therebetween.

9. A driving method for a solid-state imaging element, comprising the steps of:

setting a desired region in a pixel array unit as a window region to be accessed, the pixel array unit having pixels arranged in a matrix, each pixel including a photoelectric conversion element, an effective pixel region, and an optical black region disposed adjacent to the effective pixel region; and performing, concurrently with access to the window region and an output processing, a reset access on an adjacent row located between the window region and the optical black region, the adjacent row spanning an entire row of pixels in the matrix and not being a part of the window region and the optical black region.

10. The driving method according to claim 9, wherein the pixel array unit has the window region in at least the effective pixel region.

11. The driving method according to claim 9 or 10, further comprising: performing the read or reset access on the adjacent row during a blanking output period.

12. The driving method according to claim 9, wherein the pixel drive control unit includes a read address counter configured to generate a read address, a reset address counter configured to generate a reset address, and a window-adjacent address generation unit configured to generate an address of the adjacent row that is adjacent to the window region, and further comprising selectively switching between the address generated by the read address counter or the reset address counter and the address of the adjacent outer row generated by the window-adjacent address generation unit.

13. The driving method according to claim 12, further comprising determining the address of the adjacent row generated by the window-adjacent address generation unit using calculation from a setting value of the window region.

14. The driving method according to claim 12, further comprising setting the address of the adjacent row generated by the window-adjacent address generation unit.

15. The driving method according to claim 12, further comprising selecting the address generated by the window-adjacent address generation unit during a blanking period, and selects the address generated by the read address counter during an effective pixel output period.

16. The driving method according to claim 9, further comprising:

setting the window region in the effective pixel region and the optical black region, and selecting a width of a window region in the effective pixel region and a width of a window region in the optical black region so that a trade-off can be made therebetween.

17. A camera system comprising:

a solid-state imaging element;

an optical system configured to form a subject image on the solid-state imaging element; and a signal processing circuit configured to process an output image signal of the solid-state imaging element, the solid-state imaging element including a pixel array unit having pixels arranged in a matrix, each pixel including a photoelectric conversion element, an effective pixel region, and an optical black region disposed adjacent to the effective pixel region, and a pixel drive control unit configured to control driving of the pixel array unit so as to perform a read or reset access operation of the pixel array unit in accordance with specified address information, wherein the pixel drive control unit sets a desired region in the pixel array unit as a window region to be accessed, and wherein the pixel drive control unit performs, concurrently with access to the window region and an output processing, the read or reset access operation on an adjacent row located between the window region and the optical black region, the adjacent row spanning an entire row of pixels in the matrix and not being a part of the window region and the optical black region.

* * * * *